(12) United States Patent
Kogami et al.

(10) Patent No.: US 7,568,601 B2
(45) Date of Patent: Aug. 4, 2009

(54) CUP HOLDER UNIT PROVIDING STABILITY FOR HOLDING MEMBER

(75) Inventors: Mitsuru Kogami, Utsunomiya (JP); Masakazu Hanano, Wako (JP); Eiji Toba, Shioya-gun (JP)

(73) Assignees: NIFCO Inc., Yokohama-shi, Kanagawa-ken (JP); Honda Motor Co., Ltd., Tokyo (JP); TS Tech Co., Ltd., Aska-shi, Saitama-ken (JP)

( * ) Notice: Subject to any disclaimer, the term of this patent is extended or adjusted under 35 U.S.C. 154(b) by 486 days.

(21) Appl. No.: 11/194,444

(22) Filed: Aug. 2, 2005

(65) Prior Publication Data

US 2006/0027617 A1 Feb. 9, 2006

(30) Foreign Application Priority Data

Aug. 4, 2004 (JP) ............................. 2004-227719

(51) Int. Cl.
*B60N 3/00* (2006.01)
*B60R 7/06* (2006.01)
*B60R 7/00* (2006.01)

(52) U.S. Cl. .................. 224/483; 220/737; 220/345.1; 224/926; 224/281; 248/311.2; 297/188.17; 312/246

(58) Field of Classification Search .............. 220/8, 220/345.1, 737; 224/281, 483, 926; 248/27.1, 248/27.3, 311.2; 297/188.17; 312/246; 403/59
See application file for complete search history.

(56) References Cited

U.S. PATENT DOCUMENTS

| | | | | |
|---|---|---|---|---|
| 3,606,112 A | * | 9/1971 | Cheshier | 224/554 |
| 3,899,982 A | * | 8/1975 | Fetzek | 108/25 |
| 4,417,764 A | * | 11/1983 | Marcus et al. | 297/188.17 |
| 4,892,281 A | * | 1/1990 | DiFilippo et al. | 248/311.2 |
| 4,953,771 A | * | 9/1990 | Fischer et al. | 224/549 |
| 5,007,610 A | * | 4/1991 | Christiansen et al. | 248/311.2 |
| 5,096,152 A | * | 3/1992 | Christiansen et al. | 248/311.2 |
| 5,171,061 A | * | 12/1992 | Marcusen | 297/188.17 |
| 5,195,711 A | * | 3/1993 | Miller et al. | 248/311.2 |
| 5,228,611 A | * | 7/1993 | Yabuya | 224/281 |
| 5,284,314 A | * | 2/1994 | Misaras et al. | 248/311.2 |
| 5,306,081 A | * | 4/1994 | Fukumoto | 312/334.44 |

(Continued)

FOREIGN PATENT DOCUMENTS

| | | |
|---|---|---|
| JP | 08-011614 | 1/1996 |
| JP | 10278653 A * | 10/1998 |
| JP | 2005-22540 | 1/2005 |

*Primary Examiner*—Anthony D Stashick
*Assistant Examiner*—Ned A Walker
(74) *Attorney, Agent, or Firm*—Manabu Kanesaka (57) ABSTRACT

A cup holder unit includes a housing case; a rest tray that switches between a pulled out position where it is moved forward from the case and a stored position where it is pushed in the case; and a holder member switchable from a non-usable position where it is superposed above the tray and stored in the case to a usable position where it is raised by a forward movement of the tray. The cup holder unit has shafts projecting from the holder member to be spaced apart from each other; clearance slots disposed in upright walls of the tray; and guide grooves disposed in the case and slanted upwardly toward front to slidably receive the shafts therein via the clearance slots. Each clearance slot includes a vertical slot and an arc-shaped slot turning toward a rear side from an upper section of the vertical slot.

7 Claims, 8 Drawing Sheets

U.S. PATENT DOCUMENTS

| | | | | |
|---|---|---|---|---|
| 5,379,978 A * | 1/1995 | Patel et al. | ............... | 248/311.2 |
| 5,427,447 A * | 6/1995 | Satoh | ...................... | 312/309 |
| 5,524,958 A * | 6/1996 | Wieczorek et al. | ..... | 297/188.17 |
| 5,628,486 A * | 5/1997 | Rossman et al. | ......... | 248/311.2 |
| 5,673,891 A * | 10/1997 | Fujihara et al. | .......... | 248/311.2 |
| 5,692,718 A * | 12/1997 | Bieck | ...................... | 248/311.2 |
| 5,749,554 A * | 5/1998 | Avila et al. | ............... | 248/311.2 |
| 5,791,617 A * | 8/1998 | Boman et al. | ........... | 248/311.2 |
| 5,857,633 A * | 1/1999 | Pelchat et al. | ........... | 248/311.2 |
| 5,876,007 A * | 3/1999 | Lancaster et al. | ........ | 248/311.2 |
| 5,890,692 A * | 4/1999 | Lee et al. | ................. | 248/311.2 |
| 5,944,240 A * | 8/1999 | Honma | ...................... | 224/281 |
| 5,988,579 A * | 11/1999 | Moner et al. | ............. | 248/311.2 |
| 6,024,395 A * | 2/2000 | Kang | ...................... | 296/37.8 |
| 6,050,291 A * | 4/2000 | Whitehead et al. | ..... | 137/355.26 |
| 6,213,546 B1 * | 4/2001 | Malusev et al. | ............. | 297/113 |
| 6,250,527 B1 * | 6/2001 | Mizue et al. | ................. | 224/281 |
| 6,253,975 B1 * | 7/2001 | Ichioka et al. | ............... | 224/281 |
| 6,349,913 B1 * | 2/2002 | Jankowski | ............... | 248/311.2 |
| 6,435,633 B2 * | 8/2002 | Hoshi | ...................... | 312/242 |
| 6,450,468 B1 * | 9/2002 | Hamamoto | .............. | 248/311.2 |
| 6,464,187 B1 * | 10/2002 | Bieck et al. | ............... | 248/311.2 |
| 6,575,542 B2 * | 6/2003 | Shimajiri | .................... | 312/332 |
| 6,655,563 B2 * | 12/2003 | Shimajiri | .................... | 224/282 |
| 6,685,152 B2 * | 2/2004 | Shirase et al. | ............. | 248/311.2 |
| 6,695,271 B2 * | 2/2004 | Bieck et al. | ............... | 248/311.2 |
| 6,702,241 B2 * | 3/2004 | Harada | .................... | 248/311.2 |
| 6,779,769 B1 * | 8/2004 | York et al. | ................ | 248/311.2 |
| 6,786,523 B2 * | 9/2004 | Ogura | ..................... | 296/24.34 |
| 6,837,470 B2 * | 1/2005 | Pacher et al. | .............. | 248/311.2 |
| 6,837,471 B2 * | 1/2005 | Izume | ...................... | 248/311.2 |
| 6,839,942 B1 * | 1/2005 | Spearing | ...................... | 24/115 R |
| 6,854,699 B2 * | 2/2005 | Nishizawa | ................ | 248/311.2 |
| 6,923,517 B2 * | 8/2005 | Yamamoto | ................... | 312/332 |
| 7,104,609 B2 * | 9/2006 | Kim | ...................... | 297/411.35 |
| 7,121,517 B2 * | 10/2006 | Oana | ....................... | 248/311.2 |
| 7,131,690 B2 * | 11/2006 | Bollaender et al. | ...... | 297/188.17 |
| 7,140,660 B2 * | 11/2006 | Oana | ......................... | 296/37.8 |
| 7,225,957 B2 * | 6/2007 | Kogami | ...................... | 224/483 |
| 7,278,619 B2 * | 10/2007 | Kiyohara et al. | .......... | 248/311.2 |
| 7,303,216 B2 * | 12/2007 | Bella et al. | ................. | 292/303 |
| 2002/0171018 A1 * | 11/2002 | Harada | ..................... | 248/311.2 |
| 2004/0021050 A1 * | 2/2004 | Izume | ...................... | 248/311.2 |
| 2005/0000991 A1 * | 1/2005 | Kogami | ...................... | 224/483 |

\* cited by examiner

CUP HOLDER UNIT PROVIDING STABILITY FOR HOLDING MEMBER

BACKGROUND OF THE INVENTION AND RELATED ART STATEMENT

The present invention relates to a cup holder unit for holding a can, container, or the like, wherein the cup holder unit can stably hold a holder member.

Figure 9:
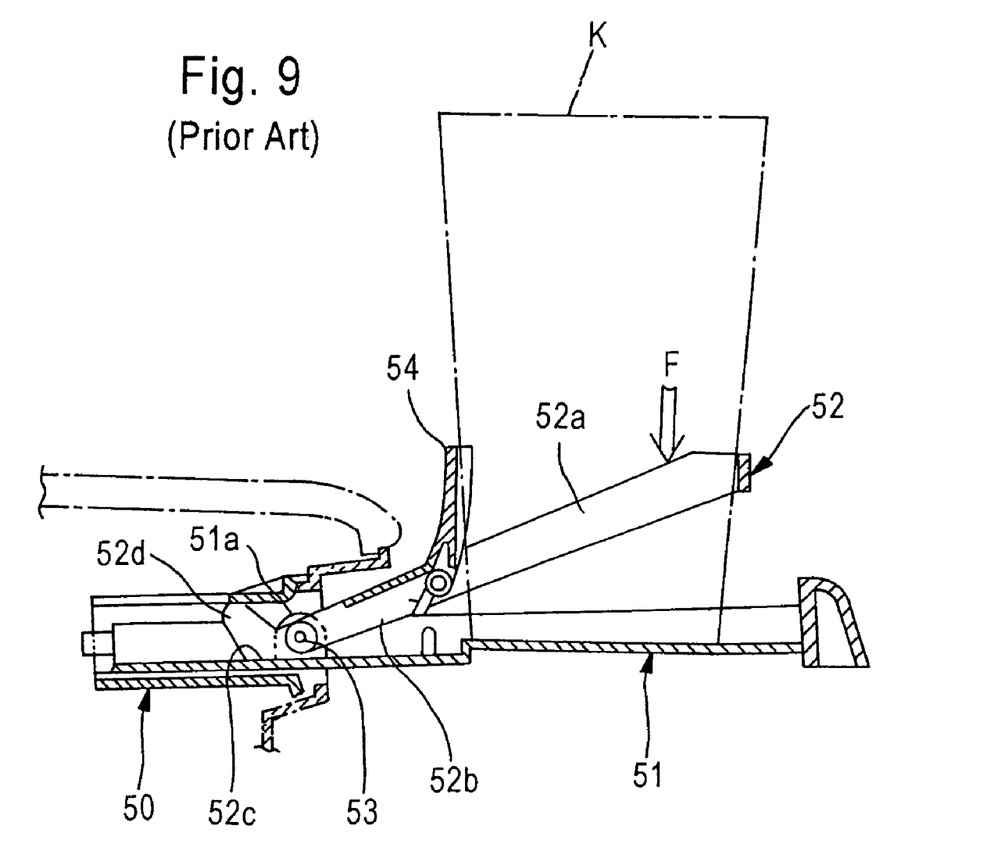
FIG. 9 is a view showing a conventional cup holder unit.

FIG. 9 shows a cup holder unit disclosed in Patent Reference 1, which comprises a housing case (retainer) 50, a tray 51 that switches between a pulled-out position and a stored position relative to the case 50, and a holder member 52 that switches from a non-usable position where it is superposed above the tray 51 and housed in the case 50 to a usable position where it is raised by a forward movement of the tray 51. When the holder member 52 is in the usable position, a container K, rested on the tray 51, is surrounded and restricted by a hole of a holding section 52a. The tray 51 has a pair of mounting pieces 51a projecting from a bottom surface thereof, and is moved along guide rails disposed at both inner sides of the case 50.

The holder member 52 has a pair of support pieces 52b connected to the holding section 52a, pins 53 projecting from the support pieces 52b, a lower stopper surface 52c, and an upper lock section 52d disposed on a base end side of the support pieces 52b. The holder member 52 is rotatably assembled with the mounting pieces 51a via the pins 53, and is biased upwardly by a spring member (not shown).

In an operation, when the tray 51 is pulled out from the stored position to the pulled-out position, the holder member 52 is lifted up at an angle using the bias force about the pins 53. In this state; the stopper surface 52c abuts against the bottom plate of the tray 51 to restrict the holder member 52 from turning excessively. The lock section 52d engages an upper plate of the case 50 to prevent the holder member 52 from turning toward the non-usable position even when a downward load F is inadvertently applied to the holder member 52.

Reference numeral 54 is a sub-holder member, which absorbs rattling of the container by pressing a periphery of the container in one direction when the container is smaller than the hole of the holding member 52a.

Patent Reference 1: Japanese Patent No. 2794389

An attempt to improve performance and simplify each switching operation of the cup holder unit described above is restricted for the following reasons. Since the holder member 52 is raised by pivoting about the pin 53 using the bias force of the spring member, the bias force of the spring member needs to be large, which becomes a factor in reducing the switching operation performance. This is because the load received by the holder member 52 from the case 50 to place itself above the tray 51 when the tray 51 is switched to the stored position, for example, needs to be as large as or in proportion to the bias force of the spring member.

It is structurally desirable, therefore, to omit the spring member for moving the holder member upwardly while maintaining the operational characteristics. The tray 51 and the holding member 52 are connected simply via the pins 53, and always move back and forth as a unit. Thus, the unit lacks design flexibility. Moreover, in the structure wherein the holder member 52 is raised and the container K is inserted into the hole of the holding section 52a for peripheral restriction, the holder member 52 is desirably raised so as to be oriented in parallel to the tray 51 to the extent possible from the perspectives of holding stability and appearance. In this case, the construction that employs a parallel link (Patent Reference 1) to move the holder member up and down relative to the tray increases the overall size of the tray.

The present inventors have previously developed the invention disclosed in Japanese Patent Application No. 2003-190899 to eliminate the problems described above.

An object of the present invention is to make further improvement to the previous invention to improve quality by increasing the operational performance of each member while simplifying the construction.

Further objects and advantages of the invention will be apparent from the following description of the invention.

SUMMARY OF THE INVENTION

In order to attain the objects described above, according to the present invention, a cup holder unit comprising a housing case; a rest tray that switches between a pulled out position where it is moved forward from the case and a stored position where it is pushed into the case; and a holder member for peripheral restriction operatively connected to the tray and switchable from a non-usable position where it is superposed above the tray and stored in the case to a usable position where it is raised by a forward movement of the tray.

The cup holder unit has a plurality of shafts projecting from the holder member spaced apart both front to back and up and down; upright walls projecting from the tray; clearance slots disposed in the upright walls to allow the shafts to respectively penetrate therethrough; and guide grooves disposed on side plates of the case that are slanted upwardly toward their front terminals to slidably fit the shafts therein via the clearance slots. The clearance slots each comprises a vertical slot extending up and down and an arc-shaped slot turning toward a rear side from an upper section of the vertical slot. The tray and the holder member are respectively switched to positions with accompanying sliding of the shafts relative to said clearance slots and guide grooves, and the tray achieves the final pulled-out position according to the arc-shaped slots, while the holder member achieves the final usable position according to the arc-shaped slots.

In the construction described above, the tray is pulled out from the stored position along the guide grooves of the case via the shafts of the holder member, and switched to its final pulled-out position according to the arc-shaped slots. The holder member is switched to its final usable position according to the arc-shaped slots. In this case, the holder member is raised at a base end side of the holder by the shapes of the clearance slots of the tray and the guide grooves of the case. The entire holder member is elevated substantially in parallel to the tray to be switched to the usable position.

A rising distance of the holder member is determined by a height of the upward tilt at the terminals of the guide grooves and the vertical dimension of the vertical slots of the clearance slots. In the usable position, the plural shafts are fitted to and maintained in the arc-shaped slots of the tray.

The present invention described above has the following effects. In a first aspect, the tray and the holder member are moved relatively and in accordance with the movements of the shafts corresponding to the clearance slots, i.e., the vertical and arc-shaped slots, thereby improving design flexibility. The resulting effects include, for example, a more compact unit achieved by reducing an overall size of the tray without diminishing the holding performance and appearance, improved holding performance achieved by enabling the holder member to rise substantially horizontal to the tray, and simplification achieved by omitting the spring member for raising the holder member that is essential in the conventional unit.

In a second aspect, the slot forming sections, which define the arc-shaped slots, are disposed so as to enable resilient displacement, and the shafts are slid while they resiliently abut against the slot forming sections. Subsequent to the rise of the holder member effected by the shafts in connection with the vertical slots of the clearance slots and the guide grooves, rattling of the holder member is absorbed when and after it is further moved forward relative to the tray by the shafts that move into the arc-shaped slots of the clearance slots, thereby improving operation characteristic.

In a third aspect, the slot forming sections of the arc-shaped slots are formed of resilient pieces formed via the cutouts that are formed through the upright walls. Thus, the construction is realized in a simplified manner.

DETAILED DESCRIPTION OF PREFERRED EMBODIMENTS

Figure 1:
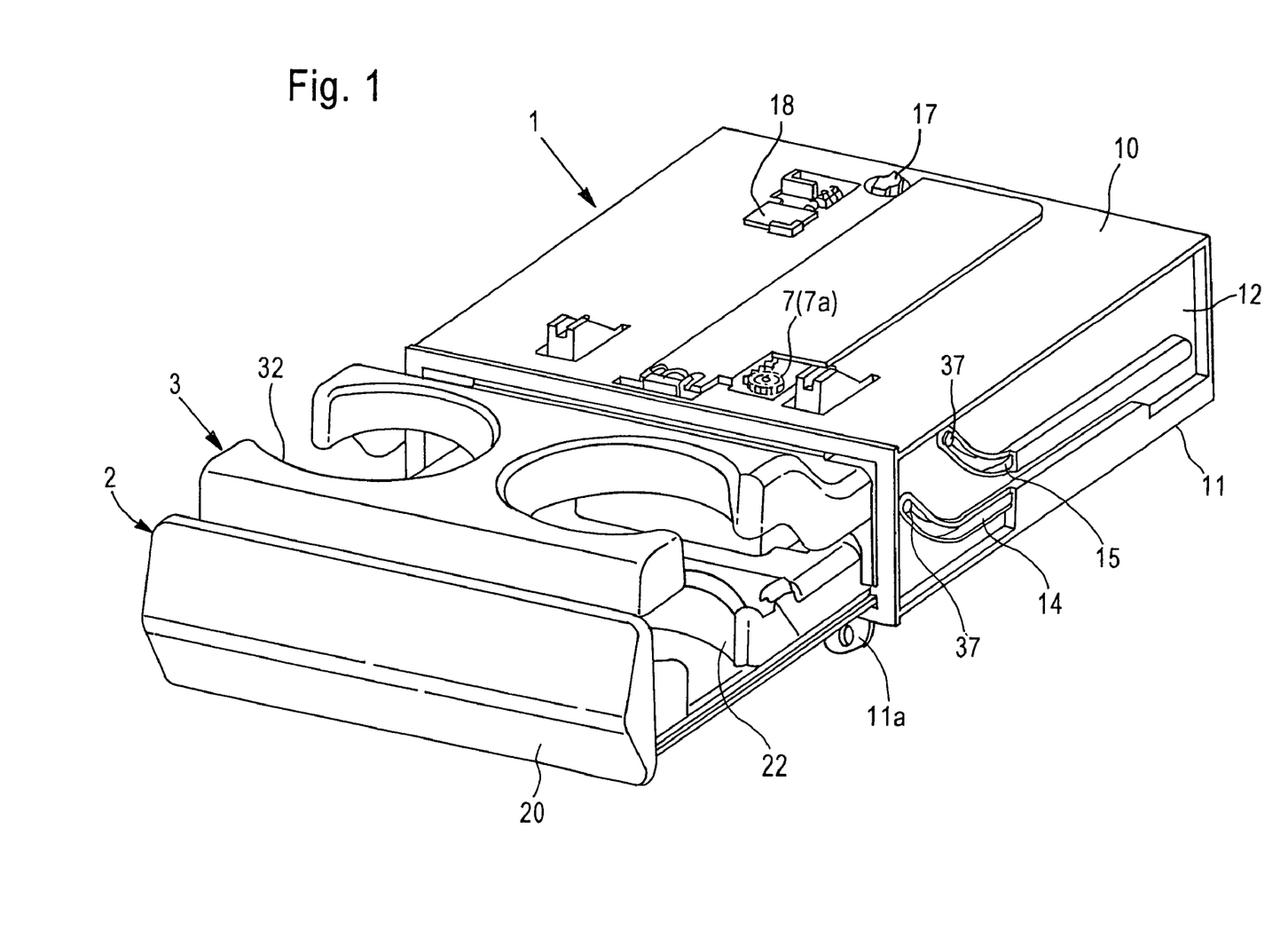
FIG. 1 is a schematic perspective view of a cup holder unit according to an embodiment of the present invention.
Figure 2A:
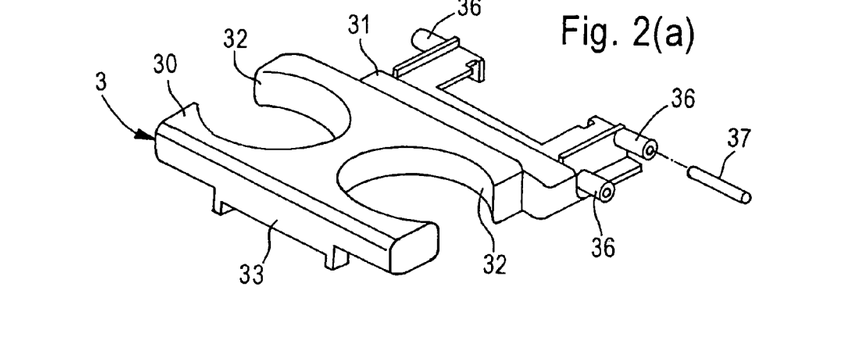
FIGS. 2(a) to 2(c) are schematic exploded views showing members of the cup holder unit.
Figure 2B:
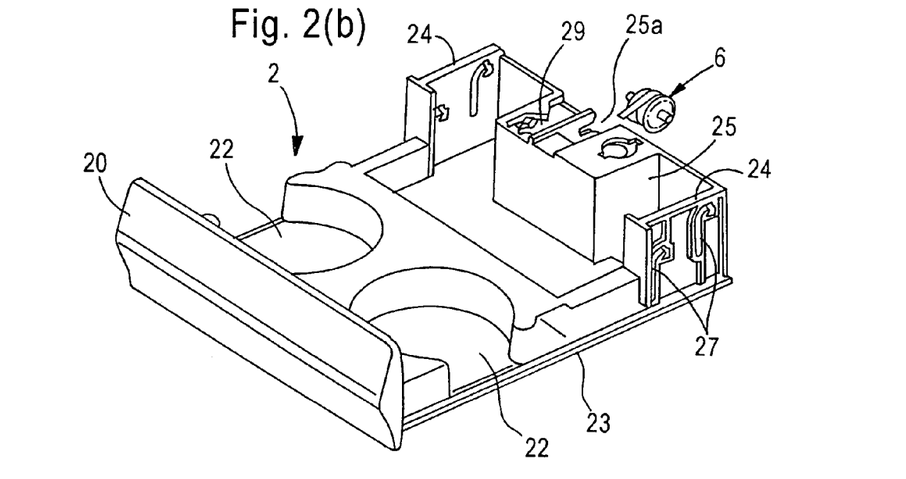
Figure 2C:
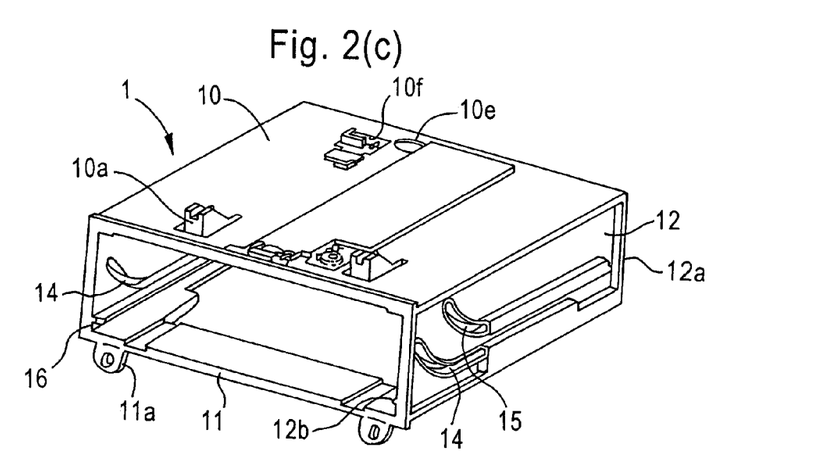
Figure 3A:
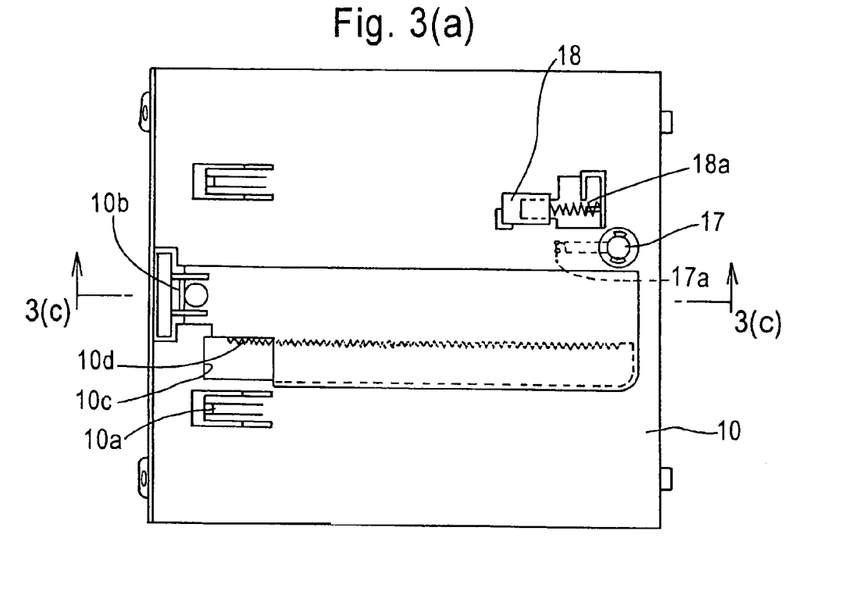
FIGS. 3(a) to 3(c) are views showing a case of the cup holder unit.
Figure 3B:
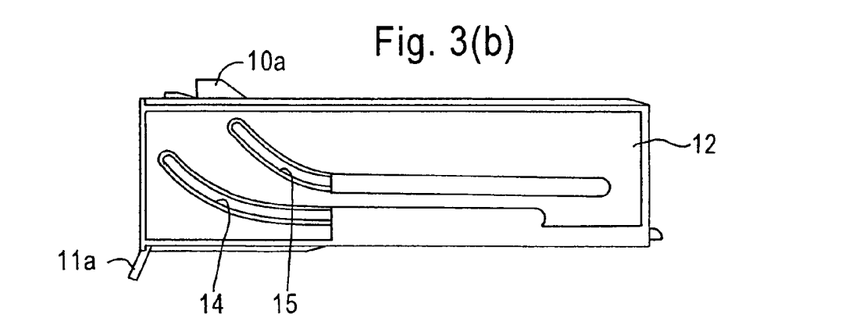
Figure 3C:
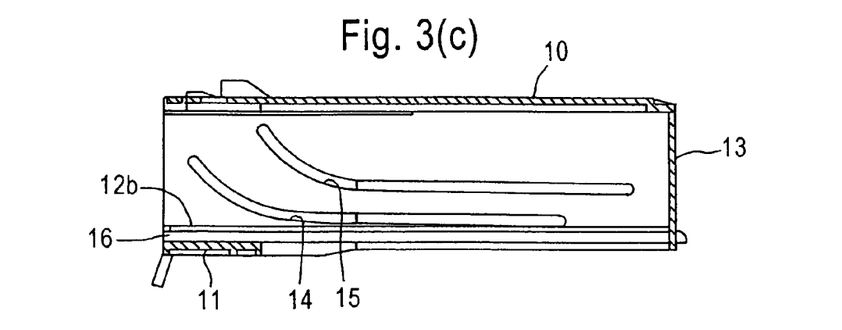
Figure 4A:
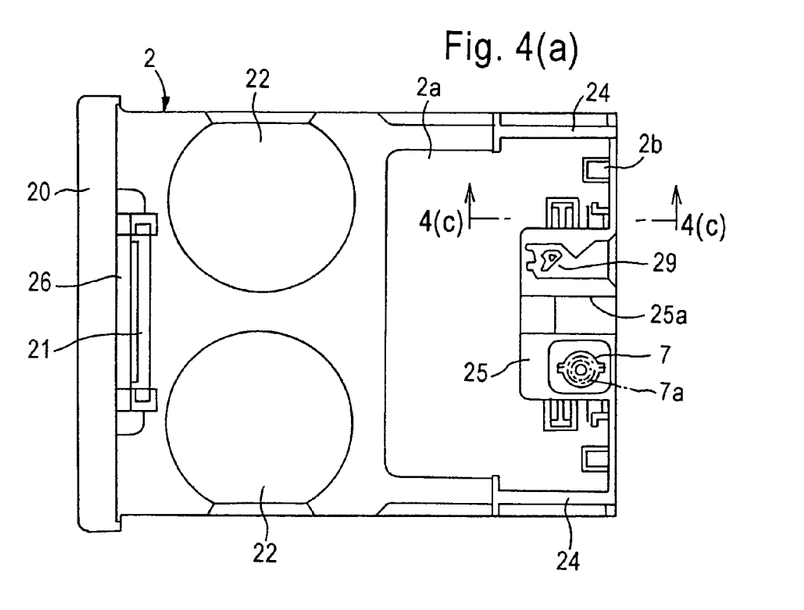
FIGS. 4(a) to 4(c) are views showing a tray of the cup holder unit.
Figure 4B:
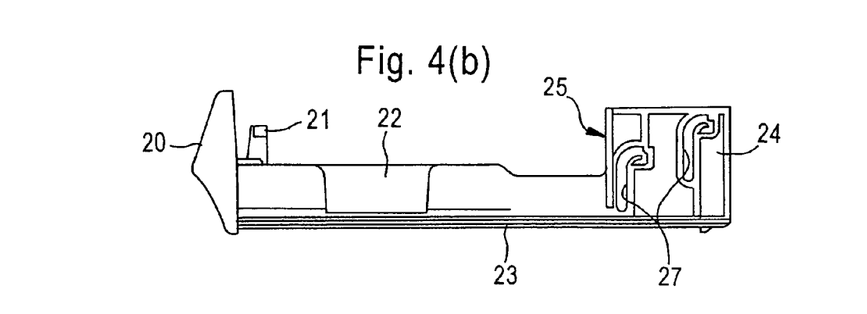
Figure 4C:
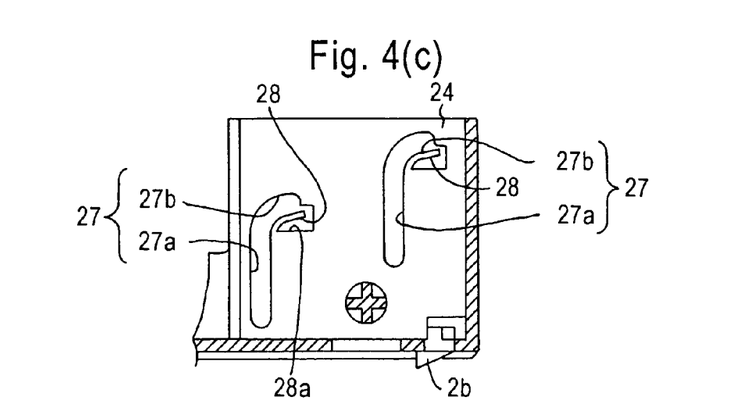
Figures 5A, 5B:
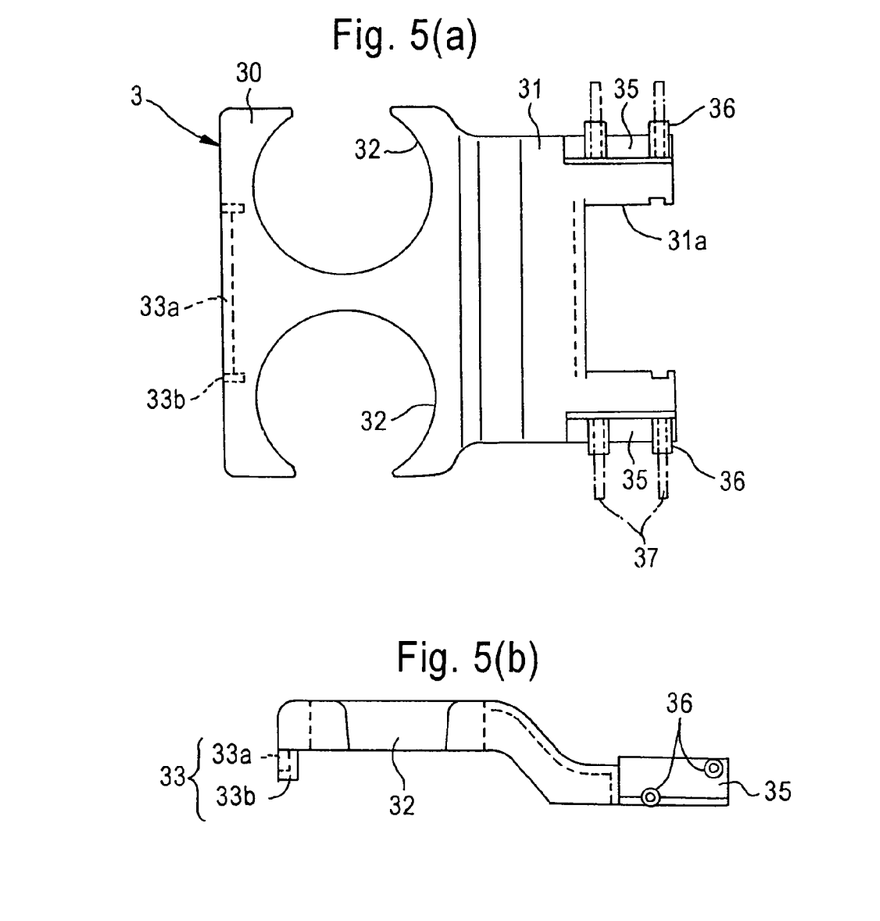
FIGS. 5(a) and 5(b) are views showing a holder member of the cup holder unit.
Figure 6:
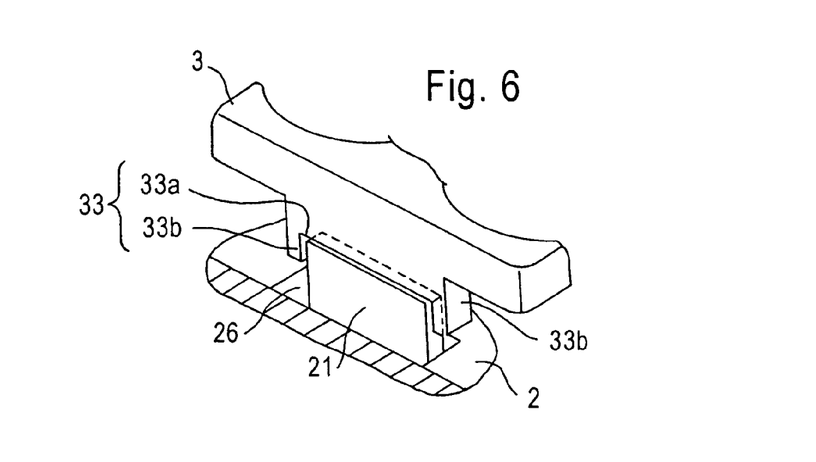
FIG. 6 is a view showing a relation between ribs of the tray and the holder member.
Figure 7A:
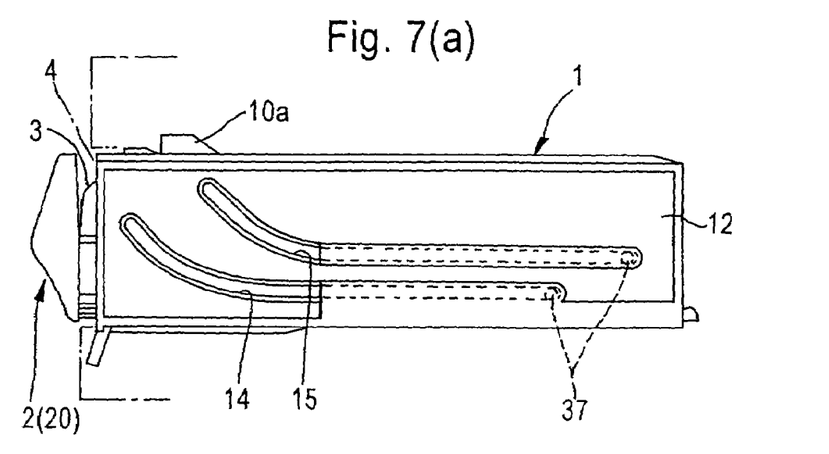
FIGS. 7(a) and 7(b) are views showing an operation of the cup holder unit.
Figure 7B:
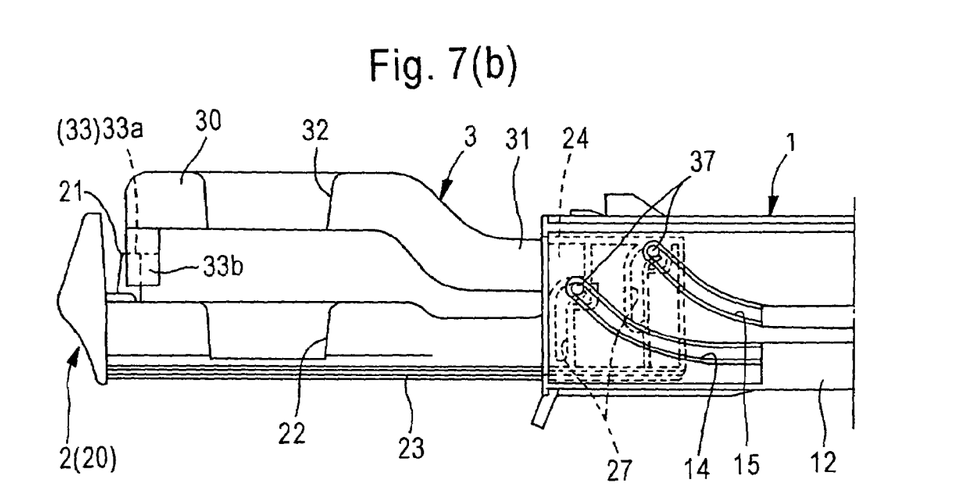

Hereunder, embodiments of the present invention will be explained with reference to the accompanying drawings. FIGS. 1 and 2(a) to 2(c) are views of the cup holder unit. FIGS. 3(a) to 3(c) show a case unit, wherein FIG. 3(a) is a top view thereof, FIG. 3(b) is a side view thereof, and FIG. 3(c) is a sectional view taken along line 3(c)-3(c) in FIG. 3(a). FIGS. 4(a) to 4(c) show a tray unit, wherein FIG. 4(a) is a top view thereof, FIG. 4(b) is a side view thereof, and FIG. 4(c) is a sectional view taken along line 4(c)-4(c) in FIG. 4(a). FIGS. 5(a) and 5(b) show a holder member unit, wherein FIG. 5(a) is a top view thereof and FIG. 5(b) is a side view thereof. FIG. 6 is a schematic showing a relationship between a support rib and an abutting rib. FIGS. 7(a) and 7(b) show an operation of the unit, and FIGS. 8(a) and 8(b) also show the operation. In the following description, a detailed explanation of the unit construction will be followed by a description of the operation.

(Unit Construction)

The cup holder unit according to an embodiment comprises the following major members: a housing case 1, a rest tray 2, and a holder member 3 for peripheral restriction. The major movements are as follows: the tray 2 is switched between a pulled-out position where it is moved forward relative to the case 1 and a stored position where it is moved rearward, i.e., pressed back in place. The holder member 3, which is operatively connected to the tray 2, is switched from a non-usable position where it is superposed above the tray 2 and stored in the case 1 to a usable position where it is raised by the forward movement of the tray 2. The cup holder unit is installed in a recess 4, with a front side open, of an armrest which comprises a seat installed in a vehicular cabin as shown in FIG. 7(a). It may be installed elsewhere; in various consoles, for example.

Among the major members, the case 1 is defined by upper and lower plates 10 and 11, left and right side plates 12, and a back plate 13, forming a roughly flat box. The upper plate 10 is provided with a pair of positioning pieces 10a and a pair of spring anchors 10b disposed at the front; an opening 10c disposed slightly to one side of the crosswise center; a latching teeth section 10d continuously formed from one end face of the opening 10c to the inner surface longitudinally; a section 10e for mounting a tracing member; and a section 10f for placing a G sensor in the rear.

The lower plate 11 is provided only in the front portion, and has plural mounting pieces 11a-disposed in the front. The left and right side plates 12 are bordered with peripheral ribs 12a. The inner side of each of the ribs 12a is provided with several (two) guide grooves 14 and 15 that have the same shape longitudinally, one being positioned below the other. Each of the guide grooves 14 and 15 penetrates through the respective side plate in the front section, and the rear section is a groove formed continuously from the through section onto the inner surface.

Each of the guide grooves 14 and 15 is shaped so as to form a substantially horizontal groove between the rear terminal and a certain point in the front section, and a tilted groove which is tilted upwardly toward the front terminal. A distance between the two guide grooves 14 and 15 is set so that a distance between the rear terminals becomes substantially equal to a distance between the front terminals. Each side plate 12 is provided with a projecting piece 12b that extends longitudinally in parallel with the lower plate 11. The projecting piece 12b forms a guide groove 16 in conjunction with the lower plate 11, which has a C-shaped cross section.

In the case 1 described above, a tracing member 17 placed therein is pivoted on the mounting section 10e so as to rock, and a G sensor 18 is installed to the section 10f provided therefore. The tracing member 17 has a pin 17a disposed below the tip end to comprise a locking means, i.e., a push-push engaging mechanism, together with the later described heart cam groove 29 of the tray 2. The push-push engaging mechanism locks the tray 2 when the tray is pushed and switched to the stored position, and unlocks it with another push operation. The G sensor 18 is disposed while being biased by a spring 18a, and prevents the tray 2 from inadvertently disengaging while in the stored position when the tray 2 is pushed in by an inertial force generated, for example, by sudden braking or a collision.

The tray 2 is a plate that is operated in and out of the front opening of the case 1. The tray 2 has a cover 20 disposed at the leading end thereof; a convex support rib 21 disposed upright behind the cover 20; left and right rests 22 disposed on the rear of the support rib 21; and side edges 23 thinly disposed on both sides from the front to back to be fitted to the guide grooves 16. Section 2a, which is behind and provided one level lower than the rests 22, has side walls or upright walls 24 projected at both sides in the rear and a mount 25 disposed substantially in the crosswise center. The cover 20 is sized to make the front opening of the case 1 invisible from the outside. The support rib 21 is projected in size to correspond to the lifted height of the tray 3 and disposed substantially in parallel to and at crosswise center of the inner surface of the cover 20.

The front plate section located between the support rib 21 and the cover 20, and on both sides of the rib 21, goes through from top to bottom, and one part thereof forms a recessed lower space 26. The lower space 26 is sufficient as long as it leaves sufficient clearance for the corresponding lower section of the later described abutting rib 33. The rests 22 are recesses for receiving the bottom surface of a container K; the recesses lack a section at the left and right in order to hold a container that is larger than the recesses. Reference 2b is a stopper that restricts the pulled-out position of the tray 2. That is, the stopper 2b abuts against the corresponding section of the case bottom 11 when the tray 2 is maximally pulled out of the case.

The left and right upright walls 24 are each provided with two clearance slots 27 that are of symmetrical configuration, as shown in FIG. 4(c). Each clearance slot 27 is formed of a vertical slot 27a that extends up and down, and a substantially arc-shaped slot 27b that turns toward the rear from the upper end of the vertical slot 27a. The two clearance slots 27 are spaced apart, and the rear slot is disposed one level higher than the front slot. The height of the vertical slot 27a substantially corresponds to how much the tray 2 rises, and also corresponds to the distance between the rear terminals of the aforementioned guide grooves 14 and 15.

The arc-shaped slot 27b is shaped to allow the relative movements of the tray 2 and the holder member 3. The critical points are that the arc turns toward the rear from the upper end of the vertical slot 27a, and the rear end of the arc is located at the highest position. In addition, among the slot forming sections that define and form the arc-shaped slot 27b, the lower section is formed of a resilient piece 28, which resiliently rocks about the base end, due to the presence of a cutout section 28a. The resilient piece 28 is configured so as to rock when the later described shaft 37 is resiliently abutted against the upper edge of the piece.

The mount 25 has a void in the mid section, and the left and right rear sections are defined by the void 25a. The biasing means 6 shown in FIG. 2(b) is installed in the void 25a. On the upper surface on one side, a heart cam groove 29 is created. On the upper surface on the other side, a damper means 7 is installed. The biasing means 6 is a Conston spring, and biases the tray 2 in the direction of being pulled out from the case 1 at all times when mounted in the void 25a with one spring end that is pulled out of the body being secured to a spring anchor 10b at the upper front side of the case via a latching means or the like. The heart cam groove 29 has a convex head cam section (a roughly heart-shaped convex cam section) that engages and disengages from the pin 17a of the tracing member 17.

The operation is as follows: it locks when the tray 2 is pushed into the case 1 against the bias force of the biasing means 6 and after pressing force ceases in the stored position, and unlocks upon another push operation, as described earlier. Once unlocked, the tray 2 automatically returns to the pulled-out position using the bias force of the biasing means 6. The damper 7 is of a hydraulic type having a known rotary gear 7a, for example, and the rotary gear 7a receives the resistance of the hydraulic oil in the body. The operation is as follows: the rotary gear 7a engages the teeth 10d of the case, and the engagement allows the tray 2 to receive the dampening force of the damper means 7 to move at a substantially constant speed when the tray 2 is moved by the bias force of the biasing means 6 from the stored position to the pulled-out position.

The holder member 3 has a size to be superposed above the tray 2 with a margin, and is formed of a front plate 30 and a rear plate 31, which is provided one level lower than the front plate 30. The front plate 30 is provided with two holes 32 into which containers are inserted, and an abutting rib 33 is disposed below the front end. Each hole 32 is disposed so as to correspond with the respective rest 22; and the border of the hole 32 lacks one section.

Moreover, the front portion of the front plate 30 where it borders holes 32 is formed to have a downward-facing C-shaped cross section; the support rib 21 fits into the space created by the C-shaped section. The abutting rib 33 is disposed at the front wall portion of the C-shaped section that defines said space, and is received above the support rib 21. The abutting rib 33, as shown in FIG. 6, is formed of a section 33a, which abuts with the support rib 21, and sections 33b, which are disposed on both sides, or the left and right sides, of the section 33a and slightly elongated, so that they are positioned outside of the corresponding side surfaces of the support rib 21 to prevent crosswise shifting. The abutting rib 33 has a substantially concave shape as a whole.

In this example, the sections 33b are broader in width than the section 33a, and the lower ends can be inserted into the aforementioned lower space 26. The shapes of the support rib 21 and the abutting rib 33 may be reversed. The inner peripheral surface of the hole 32 may be provided with a conventional sub-holder member, though this is omitted in the figures.

The rear plate 31 is provided with a void 31a, which is opened from the rear mid section towards the front, shoulders 35, which are created one level lower on both sides, and two shaft installing sections 36 projecting from the end faces of the shoulders 35. The void 31a is a clearance for the mount 25 of the tray. The shaft installing sections 36 are spaced apart both front to back and up and down, and the interval substantially corresponds to the distance between the rear terminals, and between the front terminals, of the guide grooves 14 and 15. In this example, moreover, the shaft installing sections 36 are substantially tubular in shape and allow the shafts 37 to be installed by pressing.

Each member described above is assembled as follows; for example, the holder member 3 is placed above the tray 2, the tray 2 is inserted into the case 1 together with the holder member 3 while fitting the side edges 23 into the inner grooves 16 of the case, and the shafts 37 are installed to the shaft installing sections 36 via the corresponding guide grooves 14 and 15 and the clearance slots 27. The case 1, the tray 2, and the holder member 3 are operatively connected by the shafts 37 that are fitted to the corresponding guide grooves 14 and 15 via the clearance slots 27 to become a cup holder unit. The pulled end of the Conston spring, or the biasing means 6, is anchored to the spring anchor 10b in the initial stage of the insertion of the tray 2 into the case 1. The body of the damper means 7 is attached to the corresponding section of the mount 25 through the opening 10c.

(Operation)

The cup holder unit described above is devised to perform the following operations.

(A) FIG. 7(a) shows the tray 2 that is pushed into the case 1 against the bias of the biasing means 6, i.e., in the stored position (the holder member 3 is in the non-usable position), and locked by the push-push engaging mechanism (the tracing member 17 and the heart cam groove 29). In this state, shafts 37 of the holder member 3 are respectively positioned and restricted at the rear terminals of the guide grooves 14 and 15 of the case 1 in the corresponding positions below the tray's vertical slots 27a. The support rib 21 is positioned in the space provided in the holder member, and the lower end sections of the abutting rib 33 are positioned in the lower space 26 of the tray.

Figure 8A:
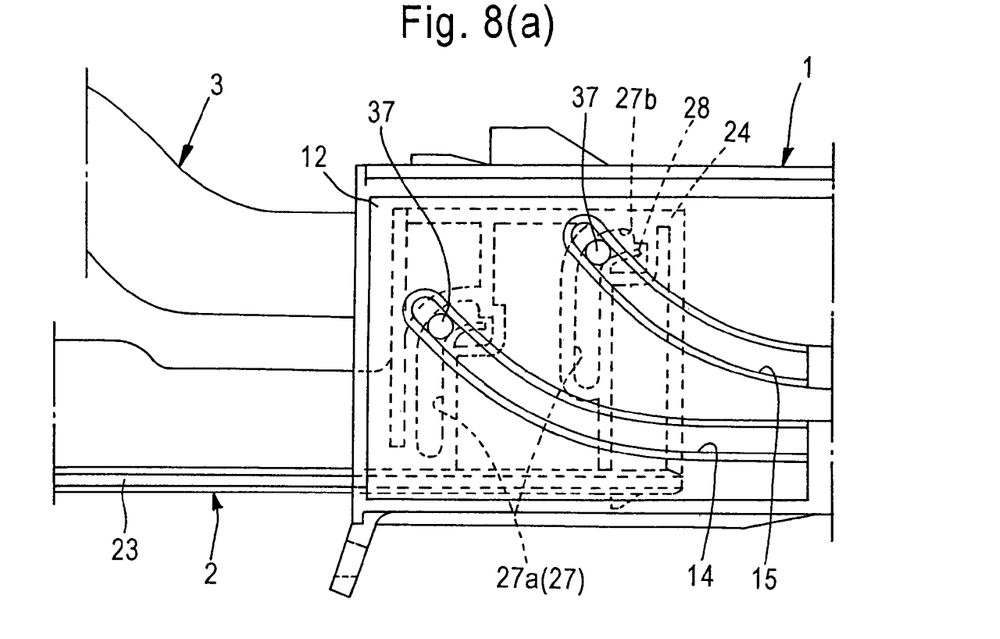
FIGS. 8(a) and 8(b) are views showing the operation of the cup holder unit.

(B) FIG. 8(a) illustrates the state wherein the tray 2 is pushed rearward via the cover 20 td disengage from the push-push engaging mechanism, and moved forward by the bias force of the biasing means 6 from the stored position. That is to say that the tray 2 is horizontally moved as the shafts 37 of the holder member move forward along the guide grooves 14 and 15 of the case 1 via the vertical slots 27a of the tray. At this point, the shafts 37 slide upwardly at an angle according to the upwardly slanted groove shapes in the front of the guide grooves 14 and 15. During that upward sliding, they are released to the vertical slots 27a of the clearance slots 27 to move up along the vertical slots 27a.

As described above, in this construction, the existence of the vertical slots 27a allows the tray 2 to maintain the horizontal movement, and the holder member 3 to be switched from the non-usable position, or the lowermost position, to the usable position, or the uppermost position, while maintaining its horizontal state. In this case, the holder member 3 maintains the horizontal state as the plural shafts 37, which are spaced apart both front to back and up and down, are lifted along the corresponding guide grooves 14 and 15. In other words, in this construction, the holder member 3 is switched to the usable position by allowing the shafts 37 to slide up along the groove shape of the case's guide grooves 14 and 15 via the clearance slots 27.

Figure 8B:
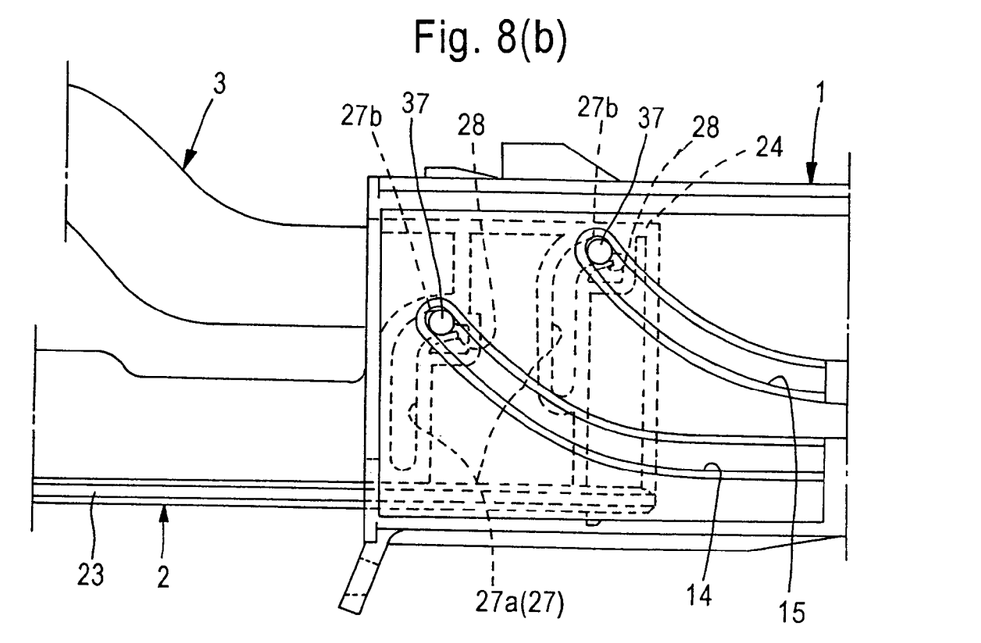

(C) FIGS. 7(b) and 8(b) show the state wherein the tray 2 is further pulled out from the state shown in FIG. 8(a) to be switched to the pulled-out position. That is, the tray 2 is further moved towards the pulled-out position, or the furthermost position, by the bias force of the biasing means 6 as the shafts 37 are released from the vertical slots 27a to the arc-shaped slots 27b. With this movement, the tray 2 further moves forward along the arc-shaped slots 27b to be switched to the final pulled-out position, and the holder member 3 further rises along the arc-shaped slots 27b to be switched to the final usable position.

Moreover, the tray's support rib 21, as shown in FIG. 6, is moved to the position directly below the abutting rib 33 of the holder member 3. The holder member 3, therefore, is supported while the plural shafts 37 are resiliently supported by the arc-shaped slots 27, i.e., between the resilient pieces 28 and the opposing slot edges, and the abutting rib 33 is abutted with and supported by the support rib 21 at the leading end. For this reason, in this construction, the holder member 3 is stably maintained in the horizontal condition even when subjected to excessive downward load, thereby eliminating the possibility of inadvertent lowering or vibration induced rattling.

(D) In this construction, since the support rib 21 supports the leading end of the holder member 3 while being placed within the recess of the abutting rib 33, as shown in FIG. 6, it remains integral with the tray 2 even if the holder member 3 is subjected to crosswise load or vibration. This increases the container holding performance. To switch the tray 2 back to the stored position, the above operation is reversed, i.e., the operative connection of the shafts 37 with the clearance slots 27 and the guide grooves 14 and 15, to effect the switch from the state shown in FIG. 8(a) to the state shown in FIG. 7(a).

The embodiment described above does not in any way restrict the present invention. Various modifications, excluding the certain requirements disclosed in claim 1, may be made based on this embodiment. For example, the shapes of the tray's rests 22 and the holder member's holes 32 may be altered, and a sub-holder member of various types may be added to the holes 32, as in the case of the prior art unit.

The disclosure of Japanese Patent Application No. 2004-227719, filed on Aug. 4, 2004, is incorporated in the application.

While the invention has been explained with reference to the specific embodiments of the invention, the explanation is illustrative and the invention is limited only by the appended claims.

What is claimed is:

1. A cup holder unit, comprising:
   a case having side plates,
   a tray disposed in the case for moving between a pulled out position where the tray projects forward from the case and a stored position where the tray is pushed in the case, said tray having upright side walls,
   a holder member operationally connected to the tray for moving from a non-usable position where the holder member is overlapped with the tray and stored in the case to a usable position where the holder member is raised when the tray projects forward,
   a plurality of shafts projecting laterally from the holder member and arranged horizontally and vertically spaced apart from each other,
   clearance slots disposed in the upright side walls for receiving the shafts, each of said clearance slots having a vertical slot extending vertically and an arc-shaped slot extending from an upper section of the vertical slot and curved toward a rear side so that when the shafts are situated in the arc-shaped slots, the tray is situated at the pulled out position and the holder member is situated at the usable position, and
   guide grooves disposed in the side plates of the case to slant upwardly toward a front side, said guide grooves slidably receiving the shafts through the clearance slots therein so that the tray and the holder member move while the shafts slide in the clearance slots and the guide grooves.

2. A cup holder unit according to claim 1, wherein each of said arc-shaped slots includes a resilient piece curved in an arc-shape to form the slot.

3. A cup holder unit according to claim 2, wherein said holder member includes shaft inserting sections for holding the shafts to project therefrom.

4. A cup holder unit according to claim 1, wherein said guide grooves and the clearance slots are formed such that as the tray is pulled forward, the shafts are moved upwardly along the guide grooves in the clearance slots.

5. A cup holder unit according to claim 1, wherein said arc-shaped slot has an upper end located higher than the vertical slot.

6. A cup holder unit, comprising:
   a case having side plates,
   a tray disposed in the case for moving between a pulled out position where the tray projects forward from the case and a stored position where the tray is pushed in the case, said tray having upright side walls,
   a holder member operationally connected to the tray for moving from a non-usable position where the holder member is overlapped with the tray and stored in the case to a usable position where the holder member is raised when the tray projects forward,
   a plurality of shafts projecting laterally from the holder member and arranged horizontally and vertically spaced apart from each other,
   clearance slots disposed in the upright side walls for receiving the shafts, each of said clearance slots having a vertical slot extending vertically and an arc-shaped slot extending from an upper section of the vertical slot and curved toward a rear side so that when the shafts are situated in the arc-shaped slots, the tray is situated at the pulled out position and the holder member is situated at the usable position, and guide grooves disposed in the side plates of the case to slant upwardly toward a front side, said guide grooves slidably receiving the shafts through the clearance slots therein so that the tray and the holder member move while the shafts slide in the clearance slots and the guide grooves, wherein said arc-shape slot curves upwardly and includes a resilient piece forming a lower side thereof to support the shaft in the arc-shape slot.

7. A cup holder unit according to claim 6, wherein each of the upright side wall includes a cutout section adjacent to the resilient piece.

* * * * *